United States Patent [19]

Järvenpää

[11] 4,171,960
[45] Oct. 23, 1979

[54] GAS-PURIFYING DEVICE

[76] Inventor: Viljo J. Järvenpää, Vellamontie 21 as 6, 04200 Kerava, Finland

[21] Appl. No.: 900,649

[22] Filed: Apr. 26, 1978

Related U.S. Application Data

[63] Continuation of Ser. No. 715,533, Aug. 18, 1976, abandoned.

[30] Foreign Application Priority Data

Aug. 22, 1975 [FI] Finland .................................. 752376

[51] Int. Cl.² ............................................. B01D 47/08
[52] U.S. Cl. ...................................... 55/230; 55/236; 55/260; 55/428; 261/79 A; 209/144
[58] Field of Search ................ 55/230, 235, 236–238, 55/257 C, 260, 403, 407, 409, 411, 412, 428, 457 R, 257 R, 470, 472; 261/79 A, 89, 90; 209/10, 144

[56] References Cited

U.S. PATENT DOCUMENTS

| | | | |
|---|---|---|---|
| 1,149,463 | 8/1915 | Pardee | 209/211 |
| 1,408,736 | 3/1922 | Henro | 55/403 |
| 3,194,544 | 7/1965 | Jamison et al. | 55/230 |
| 3,926,787 | 12/1975 | Gay | 209/211 |

FOREIGN PATENT DOCUMENTS

| | | | |
|---|---|---|---|
| 907544 | 8/1972 | Canada | 55/238 |
| 528460 | 6/1931 | Fed. Rep. of Germany | 55/236 |
| 623343 | 7/1961 | Italy | 55/235 |
| 155435 | 9/1932 | Switzerland | 55/236 |
| 9618 | of 1914 | United Kingdom | 55/407 |
| 1367080 | 9/1974 | United Kingdom | 55/459 R |

*Primary Examiner*—David L. Lacey
*Attorney, Agent, or Firm*—Steinberg and Blake

[57] ABSTRACT

A gas-purifying device capable of removing solid and/or gaseous components from a flowing gas. The device includes a cyclone for receiving the gas and removing therefrom relatively coarse solid components, this cyclone having a tubular discharge having at an upper region in the interior of the cyclone a bottom open end through which the gas enters the tubular discharge after the relatively coarse solid components have been removed therefrom. Situated at least partly within the tubular discharge is a wet-washer for subjecting the gas flowing through the tubular discharge to a wet-washing action which removes from this gas relatively fine solid components and/or gaseous components, before the gas is discharged to the exterior of the cyclone. The wet-washer forms a sludge from the relatively fine components and/or gaseous components removed from the gas before discharge thereof to the exterior of the cyclone, and this sludge falls downwardly through the bottom open end of the tubular discharge along the interior of the cyclone. Situated beneath the bottom open end of the tubular discharge is a receiving structure which receives the sludge falling from the tubular discharge.

3 Claims, 2 Drawing Figures

GAS-PURIFYING DEVICE

This is a continuation of application Ser. No. 715,533, filed Aug. 18, 1976, now abandoned.

BACKGROUND OF THE INVENTION

The present invention relates to gas-purifying devices.

In particularly, the present invention relates to a device for removing solid and/or gaseous components present in a flowing gas, the device of the invention including a cyclone separator for separating relatively coarse solid components from the gas, while relatively fine solid components and/or gaseous components present in the flowing gas are separated therefrom by wet-washing.

As is well known, flowing gas streams often contain relatively large amounts of solids and, in addition, for example, sulphur dioxide or other gaseous components which are harmful to the environment or which for certain reasons should be recovered from the flowing gas. The relatively coarse solid components can easily be separated from the flowing gas by using devices such as, for example, cyclone separators, of which numerous different designs are well known. It is possible with certain cyclone separators to achieve a very high separating efficiency, but gaseous components cannot be separated with such cyclone separators.

Thus, in connection with removal of gaseous components, wet-washing or scrubbing is often the only possible way for removing such components from a flowing gas. However, wet-washers often do not tolerate loading with a high degree of solid matter, and on the other hand the solids may be valuable in their dry state, so that wet-washing alone is not always the best possible way to purify a flowing gas. As a result, in the separation of certain components from a flowing gas it is common to encounter in the separating apparatus the combination of a cyclone separator followed by a wet-washer or scrubber, with the separate separation steps being performed in these separate units. As a result, an apparatus of the latter type has an undesirably large size and requires considerable amounts of energy, because both of the separate separating steps have their own pressure losses. Leakage of the flowing gas, wear and tear of the apparatus, and difficulties resulting from the temperature of the flowing gas are further drawbacks which are encountered with conventional apparatus of the above type.

Various attempts have been made to eliminate the above drawbacks resulting from the combination formed by a separate cyclone separator and a separate wet-washer. At the present time it is common to use dry filters particularly in order to separate mechanical dust from a flowing gas. In dry filters a suitable construction is utilized in order to conduct both the coarse and the fine solid components in a flowing gas to the separating unit. On the other hand, it is not possible with dry filters to separate the gaseous components from the flowing gas. Therefore, with respect to such gaseous components it is still necessary to utilize a separate wet-washing procedure, and thus dry filters alone cannot completely purify the flowing gas.

SUMMARY OF THE INVENTION

It is accordingly a primary object of the present invention to provide a structure which will avoid the above drawbacks.

In particular, it is an object of the present invention to provide a device which makes it possible in a new way, which is far more efficient than prior art structures, to remove from a flowing gas simultaneously both the solid and gaseous components therein, so as to completely purify the gas with the single device of the invention.

An additional object of the present invention is to provide a device of this type which is of an exceedingly small size and which also requires a relatively small amount of energy.

Yet another object of the present invention is to provide a device of this type which makes it possible to reduce substantially problems encountered in connection with corrosion of parts in previously known devices.

With the device of the invention there is a cyclone means for receiving the gas which is to be purified and for removing therefrom the relatively coarse solid components, while the gas with relatively fine solid components and gaseous components which must be removed therefrom are received in a central tubular discharge means which forms part of the cyclone means, this tubular discharge means having a bottom open end through which the gas with the relatively fine solid components and gaseous components enters the tubular discharge means to flow therethrough toward the exterior of the cyclone means. In accordance with the invention there is situated at least partly within the tubular discharge means a wet-washer means for subjecting the gas flowing through the tubular discharge means to a wet-washing action before the gas is discharged to the exterior of the cyclone means, this wet-washer means serving to remove from the gas the relatively fine solid components as well as gaseous components and forming from these components a sludge which falls downwardly through the open bottom end of the tubular discharge means along the interior of the cyclone means. Within the cyclone means beneath the tubular discharge means is a receiving means which receives this sludge falling from the tubular discharge means, this receiving means having the form, for example, of a suitable collecting funnel.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
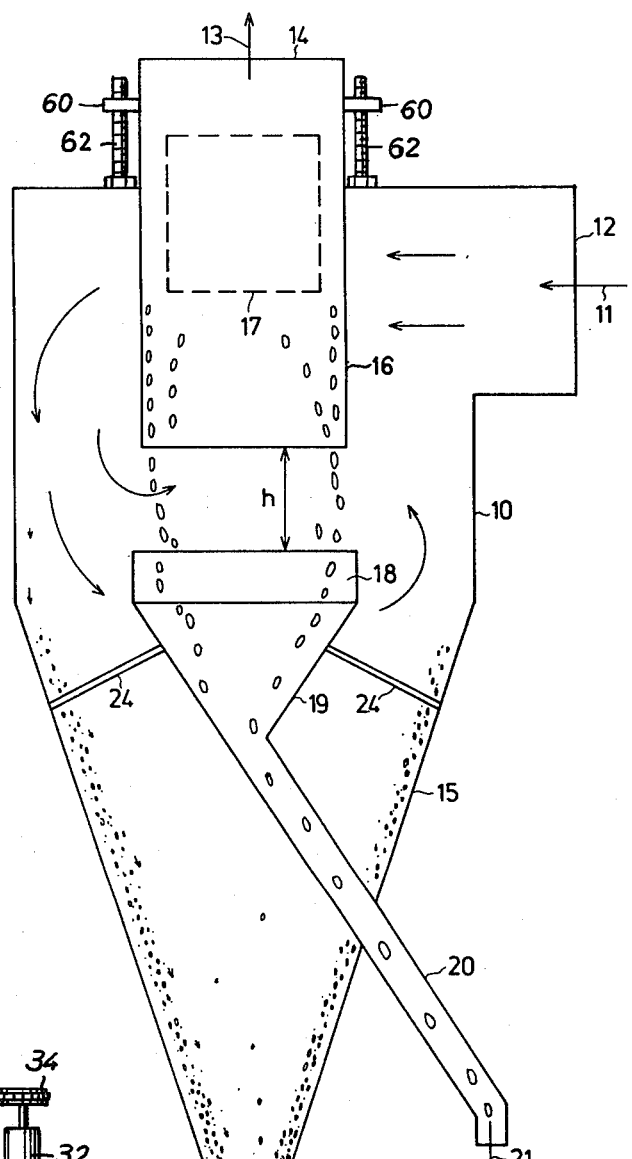
FIG. 1 is a schematic elevation of one possible embodiment of a structure according to the invention.

Referring now to FIG. 1, the device of the invention includes a cyclone means 10 which in itself is known and which is capable of separating relatively coarse solid components from a flowing gas. Thus, the cyclone means 10 has an inlet 12 which communicates with an extends in a known way tangentially from the upper cylindrical wall of the cyclone means 10 for directing into the latter of flowing gas indicated schematically by the arrow 11. In a manner which is well known, this flowing gas is directed in the interior of the cyclone means 10 helically around and downwardly along the central vertical axis of the cyclone means, so that by centrifugal force the heavier relatively coarse solid components are deposited against the inner surface of the cyclone wall to fall downwardly along the interior of the cyclone along the inner surface thereof.

The gas which is thus directed into the cyclone means 10 through the inlet 12 thereof will flow around a substantially central tubular discharge means 16 extending fluid-tightly through an opening in the top wall of the cyclone into the interior thereof and having a bottom open end through which the gas enters into the tubular discharge means 16 which at its top end 14 provides for the discharge of pure gas indicated by the arrow 13. Thus this top end 14 may be in the form of a suitable exit aperture for the gas which is discharged, and of course the gas which enters into the tubular discharge means 16 through the bottom open end thereof still has within its relatively fine solid components as well as gaseous components which should be removed from the gas in order to purify the same.

The lower portion 15 of the cyclone means 10 tapers downwardly so as to have a substantially conical construction as illustrated in FIG. 1. Of course, the cyclone separator means may have other cyclone separator constructions known in the art. Thus, the incoming gas 11 is set into a rotary downwardly directed centrifugal motion about the central tubular discharge means 16, so that, as set forth above, the coarser solid components are flung to the outer circumferential part of the flowing gas while flowing around the central axis of the cyclone and separating on the inner surface of the shell thereof while settling downwardly into the lower conical part 15, accumulating at the bottom of the latter. This lower conical portion 15 of the cyclone separator 10 may be provided at its bottom end with a suitable outlet or draining device 22 through which the dry solid matter overflow 23 separated from the gas is recovered, as indicated schematically at the lower portion of FIG. 1.

Thus, the finer solid components present in the gas flow 11 and the gaseous components remain at the inner circumferential part of the falling gas flow and enter into the central tubular discharge means 16 of the cyclone means 10, through the open lower end of the tubular means 16.

Situated at least partly within the tubular means 16 is a wet-washer means 17, schematically indicated in FIG. 1, this wet-washer means 17 providing within the tubular discharge means 16, as set forth below in connection with FIG. 2, a powerfully distributed washing liquid which sprays outwardly in a horizontal direction from the central vertical axis of the tubular discharge means 16 so that the gas flowing upwardly through the tubular discharge means 16 is subjected to a powerful liquid washing action which results in a thorough wetting of the fine solid particles and gaseous components in the gas, these particles and gaseous components forming as a result of the wetting thereof a sludge which descends along the inner surface of the wall of the central tubular discharge means 16.

Figure 2:
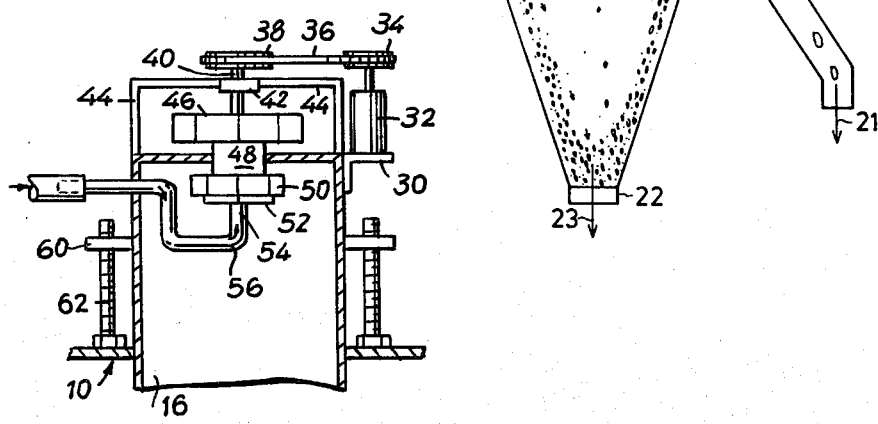
FIG. 2 is a schematic sectional elevation showing one possible example of the combination of a wet-washer means with a tubular discharge means of a cyclone, according to the invention.

The wet-washer means 17 may, for example, have a construction as shown schematically in FIG. 2 and as disclosed in applicant's copending application Ser. No. 715,211, filed Aug. 17, 1976, now U.S. Pat. No. 4,102,658. Thus, referring to FIG. 2, it will be seen that a suitable bracket 30 fixed to an upper portion of the tubular discharge means 16 carries a motor 32 which drives a pulley 34 which in turn drives a belt 36 through which a second pulley 38 is driven. This pulley 38 is fixed to a shaft 40 supported for rotation by a bearing means 42 which in turn is carried by suitable narrow relatively rigid brackets 44 also fixed to and carried by the tubular discharge means 16. The shaft 40 is fixed to and carries an exterior blower means 46 which is thus rotated by the shaft 40 and which serves to discharge purified gas to the outer atmosphere. At its inner central region the exterior blower means 46 communicates with a connecting tubular means 48 which passes fluid-tightly through an opening in the top wall of the tubular discharge means 16, this connecting tubular means 48 of course being freely rotatable with respect to this top wall of the tubular discharge means 16. At its bottom open end the connecting tubular means 48 is fixed to an internal blower means 50 which is of a smaller diameter than the external blower means 46 and which has its central interior portion communicating with the connecting tubular means 48. The internal blower means 50 thus rotates together with the connecting tubular means 48 and the exterior blower means 46, and the gas in the interior of the tubular discharge means 16 is drawn into the internal blower means 50 to flow therefrom through the connecting tubular means 48 to the exterior blower means 46 to be discharged. A bottom wall of the internal blower means 50 fixedly carries distributor vanes 52 which receives a washing liquid from the discharge end 54 of a liquid-supply pipe means 56 which is supplied with a washing liquid which forcefully discharges against the bottom rotating plate of the internal blower means 50 to be distributed by the vanes 52 horizontally and outwardly against the inner surface of the tubular discharge means 16, thus forming an umbrella of liquid through which the flowing gas must pass before being received by the internal blower means 50. This internal blower means 50 serves to separate in a highly efficient manner droplets which are flung outwardly against the inner surface of the tubular discharge means 16, while the dried purified gas continues to flow upwardly through the connecting tubular means 48 to be discharged by the exterior blower means 46.

Thus, with a wet-washer means 17 having a construction as shown in FIG. 2, the gaseous components and fine solid components separated from the gas will form a sludge which descends downwardly along the inner surface of the tubular discharge means 16 to fall downwardly out of the latter through the open bottom end thereof along the interior of the cyclone means 10.

It is to be noted that with the particular wet-washer means indicated in FIG. 2, a highly efficient droplet separation is achieved by way of the internal blower means 50, with the result that the discharged gas 13 which reaches the outer atmosphere is purified both of the finest solid components and of the gaseous components, and in addition the gas flow has also been dried so as to be free of washing liquid.

In order to prevent the sludge which falls downwardly through the open bottom end of the tubular discharge means 16 from reaching the lower tapered part 15 of the cyclone means 10, where it would undesirably join the dry solid matter accumulated in the lower part 15, a receiving means 18 is provided in the interior of the cyclone means 10 beneath and spaced from the tubular discharge means 16, located along the central axis of the tubular means 16, so that the receiving means 18 and the tubular discharge means 16 are situated along a common upright axis. The receiving means 18 takes the form of a funnel having an open top end situated beneath the open bottom end of the tubular discharge means 16 so that the falling sludge will enter into the receiving means 18. Thus, the collecting funnel or receiving means 18 is concentric or coaxial with the tubular discharge means 16, and the collected sludge flows downwardly along the interior of the receiving means 18, more particularly along the tapered lower portion 19 thereof. The bottom open end of the tapered portion 19 of the collecting funnel is connected to and communicates with a tubular member 20 which extends fluid-tightly through a wall portion of the lower part 15 of the cyclone means 10 so that the collected sludge is directed by the tube 20 to the exterior of the cyclone means 10. In this way the sludge separated as a result of the wet-washing action can be recovered as a separate outflow 21.

The receiving means 18 and the tubular discharge means 16 form a pair of means at least one of which is adjustable along the common axis of this pair of means, so that in this way it is possible to adjust the distance h between this pair of means. In the example illustrated, it is the tubular discharge means 16 which is adjustable along its axis with respect to the receiving means 18 so as to control the magnitude of the distance h. For this purpose the adjusting means includes a pair of projections 60 fixed to and projecting from the tubular discharge means 16 outwardly of and above the cyclone 10. These projections 60 are respectively formed with threaded openings passing therethrough. A pair of adjusting screws 62 extend threadedly through the bores of the projections 60, these screws 62 having their lower head ends pressing against the top wall of the cyclone means 10. The tubular discharge means 16 passes fluid-tightly through an opening in the top wall of the cyclone means 10 so as to be slidable with respect to the top wall, through the opening thereof. Thus, by turning the screws 62 it is possible to adjust the elevation of the tubular discharge means 16, and in this way adjust the distance h.

With respect to the collecting funnel 18, the diameter thereof may advantageously be somewhat larger at the top open end of the receiving means 18 than the diameter of the tubular discharge means 16. However, it is equally possible to provide for the top open end of the receiving means 18 a diameter which is equal to or smaller than the diameter of the tubular discharge means 16, because in the free space between the tubular discharge means 16 and the funnel 18 the sludge is guided toward the central part of the receiving means 18, forced toward the central part by the gas flowing into the open bottom end of the tubular discharge means 16. This gas flow results in a contraction of the downwardly flowing sludge instead of a spreading of the sludge outwardly toward the inner surface of the wall of the cyclone means 10.

Also, it is preferred to support the collecting funnel or receiving means 18 by way of a support means which includes the bracing elements or rods 24 fixedly carried by the lower conical part 15 of the cyclone separator means 10. Thus the rods 24 are uniformly distributed about the axis of the cyclone and are fixed at their outer ends to the lower wall portion 15 of the cyclone 10 while at their top ends they are fixed to the outer surface of the tapered portion 19 to the receiving means 18. In this way the support means 24 serves to support the receiving means 18 in the interior of the cyclone means 10. Of course, other arrangements are equally possible for supporting the receiving means 18 in the interior of the cyclone means 10.

By way of the above-described structure of the invention it is possible to separate from the gas flowing into the cyclone means 10 through the tangential inlet 12 thereof both dry solid matter and the sludge separated as a result of the wet-washing action, so as to constitute separate outflows 23 and 21, without requiring one unit for the dry separation and another separate unit for the wet separation. At the same time, the structure of the invention avoids considerable pressure losses which are usually incurred when separate separation and wet separation units are employed.

It is furthermore possible with the device of the invention to take care of corrosion problems in an exceedingly simple way in those cases where the components separated by wet washing give rise to corrosion in the separating unit. With the device of the invention, the parts which are resistant to corrosion may be limited, only to the tubular discharge means 16 and the receiving means 18, because the sludge which causes corrosion cannot enter and engage any other parts of the device.

In the description above and in the drawings only a single solution to the problems encountered in the prior art has been provided, but it will be obvious to those skilled in the art that on the basis of this solution numerous modifications are possible without departing from the invention. The wetting of the gas flowing into the tubular discharge means may be carried out in a number of different ways, and the distance between the tubular discharge means and the receiving means 18 as well as the ratio between the diameters thereof will depend upon the particular application of the structure of the invention. The situation of the tubular discharge means and of the collecting funnel within the cyclone also may vary, and connection between these components and the other structure may also be different.

What is claimed is:

1. A device for removing solid and/or gaseous components from a gas, comprising:
   upright cyclone means having a gas inlet for receiving the gas and for removing relatively coarse solid components therefrom, said cyclone means including a central tubular discharge means having a top wall formed with an opening passing therethrough for discharging the gas from which the relatively coarse solid components have been removed out of the cyclone means, said tubular discharge means having in said cyclone means a bottom open end through which the gas with relatively fine solid components and/or gaseous components therein enters said tubular discharge means to flow therethrough toward the exterior of the cyclone means, rotary, unitary wet-washer means situated at least in part in said tubular discharge means for providing therein an umbrella of washing liquid spreading radially from a lower end of said washing means to an inner surface of said tubular discharge means for subjecting the gas flowing therethrough toward the exterior of the cyclone means to a wet-washing and drying action for removing from the gas the finer solid components and/or gaseous components therein and for drying the gas before the gas discharges to the exterior of the cyclone means, said wet-washing means including an internal blower means situated in said tubular means adjacent said top wall thereof and an external blower means of a diameter greater than said internal blower means situated adjacent said top wall of said tubular discharge means at the exterior thereof, and said wet-washer means including a tubular means coaxial with both of said blower means, communicating with central regions thereof, and extending fluid-tightly tightly through said opening of said top wall of said tubular discharge means, so that gas discharged from said tubular discharge means passes first through said internal blower means then through said tubular means and finally through said external blower means, said internal blower means serving to separate from the gas droplets which are flung by said internal blower means against an inner surface of said tubular discharge means for drying the gas before the latter in purified condition flows through said tubular means to said exterior blower means, said wet-washer means, by said wet-washing action and by aid drying action thereof, producing from the relatively fine solid components and/or gaseous components a sludge which falls down through the open bottom end of said tubular discharge means along the interior of the cyclone means, and receiving means situated in its entirety in said cyclone means at a location spaced from and coaxially beneath said tubular discharge means for receiving the sludge falling therefrom downwardly along the interior of said cyclone means, the gas which enters said tubular discharge means through said bottom thereof first entering a space between said bottom open end of said tubular discharge means and said receiving means for acting in said space on said sludge to displace the latter toward a common axis of said tubular discharge means and receiving means.

2. The combination of claim 1 and wherein said internal blower means has a bottom wall having a lower surface fixedly carrying vanes which rotate with said internal blower means, said wet-washer means including means situated adjacent said vanes for directing toward the latter and said bottom wall of said internal blower means said washing liquid which is distributed radially from said bottom wall of said internal blower means across the interior of said tubular discharge means to form therein said umbrella of liquid through which the flowing gas must pass before being received by said internal blower means.

3. The combination of claim 2 and wherein said wet-washer means includes a drive means operatively connected with both of said blower means and with said tubular means extending between and connected to both of said blower means for rotating both blower means and said tubular means extending therebetween as a unit with respect to said tubular discharge means.

* * * * *